United States Patent [19]

Miyoshi

[11] Patent Number: 5,295,187
[45] Date of Patent: Mar. 15, 1994

[54] ILLEGAL COPY PREVENTION APPARATUS

[75] Inventor: Akio Miyoshi, Oume, Japan

[73] Assignee: Kabushiki Kaisha Toshiba, Kawasaki, Japan

[21] Appl. No.: 801,608

[22] Filed: Dec. 5, 1991

Related U.S. Application Data

[63] Continuation of Ser. No. 568,886, Aug. 17, 1990.

[30] Foreign Application Priority Data

Aug. 18, 1989 [JP] Japan .................................. 1-212173

[51] Int. Cl.⁵ .......................... G11B 23/28; G05B 9/02
[52] U.S. Cl. ............................................. 380/4; 380/3
[58] Field of Search ......................................... 380/3, 4

[56] References Cited

U.S. PATENT DOCUMENTS

| | | |
|---|---|---|
| 4,583,011 | 4/1986 | Pechar . |
| 4,584,641 | 4/1986 | Guglielmino . |
| 4,685,055 | 8/1987 | Thomas .................... 380/4 |
| 4,766,516 | 8/1988 | Ozdemir et al. . |
| 4,905,277 | 2/1990 | Nakamura .................... 380/4 |

FOREIGN PATENT DOCUMENTS

| | | |
|---|---|---|
| 00316805 | 5/1989 | European Pat. Off. . |
| 2607953 | 6/1988 | France . |
| 2173327A | 10/1986 | United Kingdom . |

Primary Examiner—Stephen C. Buczinski
Attorney, Agent, or Firm—Foley & Lardner

[57] ABSTRACT

An illegal copy prevention apparatus including a plurality of illegal copy discriminators (e.g. instructions to set flags), an event generator (e.g. detections of "0" sec in real time) corresponding to the illegal copy discriminators, and an abnormal operation generator for generating an abnormal operation when any one of the illegal discriminator and the corresponding event generator generates an event. Since the probability at which all the abnormal operations are generated by all the abnormal operation generators is low, it is extremely difficult for a violator to notice the presence of all the copy protections and further remove all the copy protections completely, thus realizing an effective illegal copy prevention apparatus for computer software and circuit configuration of IC devices.

6 Claims, 6 Drawing Sheets

ILLEGAL COPY PREVENTION APPARATUS

This application is a continuation of application Ser. No. 07/568,886, filed Aug. 17, 1990.

BACKGROUND OF THE INVENTION

The present invention relates to an illegal copy prevention apparatus of preventing written property such as computer software or the circuit configurations of semiconductor IC devices, from being copied illegally.

Recently, various illegal copy prevention apparatuses have been proposed to prevent computer software or circuit configurations of semiconductor IC devices from illegal copying. For instance, the same inventors have already proposed a prevention apparatus in U.S. Pat. application No. 269,358, now abandoned as disclosed below:

In case programs are illegally copied from an original floppy disk to another floppy disk and then the illegally copied floppy disk is driven to run programs, illegal copy discriminating means discriminates that the floppy disk is illegal. On the other hand, an event generating means generates a constant event, at a predetermined probability. Therefore, when the illegal copy detection and the event generation both occur simultaneously, an abnormal operation generating means generates an abnormal operation to disable the operation.

As described above, conventionally, the abnormal operation has been generated at a relatively low probability without generating an abnormal operation whenever illegal copying has been detected. This is because a violator who illegally copies software, for instance, cannot easily know whether the software can be copied normally or not. Therefore, after the illegally copied floppy disks have been put on the market and then used, an abnormal operation will occur in some floppy disks, so that the violator who illegally copied software notices a serious situation for the first time. Consequently, illegal copying has been prevented by not allowing the violator to remove the copy protection. That is, it has been impossible for the violator who illegally copies software to sell the illegal floppy disks, because it is difficult to discriminate whether the copied software is identical to the original one or if the protection can be removed completely.

In the above-mentioned prior-art illegal copy prevention apparatus, however, there still exists a problem, as follows. Although illegal copying can be detected by the illegal copy discriminating means and further an abnormal operation can be generated only when the event generating means generates an event at a predetermined probability, when the probability at which an event is generated is high, the violator who copies software illegally can easily discriminate whether software can be copied normally or not, with a result that the violator can compare the illegally copied software with the original one repeatedly for perfect analysis, until an abnormal operation will not be generated and therefore the copy protection function can be removed perfectly. In contrast with this, when the probability at which an event is generated is determined low, the copy protection may not be removed because the violator can not notice the presence of the copy protection. In this case however, since almost all the illegally copied software can endure to use, there exists another problem in that it is impossible to effectively prevent illegal copying.

The above-mentioned problems can be applied to circuit configuration of semiconductor IC devices by the same reason as in program software. Therefore, it has been a serious problem how to generate an abnormal operation whenever circuit configuration to be protected is copied illegally.

SUMMARY OF THE INVENTION

With these problems in mind, therefore, it is the primary object of the present invention to provide an illegal copy prevention apparatus which can effectively prevent illegal copying.

According to the present invention, an illegal copy prevention apparatus, comprises: an illegal copy discriminating section including two or more illegal copy discriminating means for discriminating whether an object is illegally copied, independently; an event generating section including event generating means, when an illegal copy is discriminated by the illegal copy discriminating means, for generating an event at a predetermined probability; and an abnormal operation generating section for generating an abnormal operation when any one of the illegal copy discriminating means discriminates an illegal copy and a further one of the event generating means corresponding to the illegal copy discriminating means which discriminates the illegal copy generates an event.

In the illegal copy prevention apparatus according to the present invention, an abnormal operation generating section generates an abnormal operation, only when any one of the illegal copy discriminating means discriminates an illegal copy and, further, the event generating means corresponding to the discriminating means (which now discriminates an illegal copy) generates an event at a predetermined probability.

That is, when one illegal copy discriminating means discriminates an illegal copy and additionally one event generating means corresponding thereto generates an event, an abnormal operation is generated by the abnormal operation generating section, so that the violator notices later that software is not copied in the same status as the original software; that is, the copy protection is not removed. In most all cases, the violator may compare the copied software with the original one for perfect analysis of protection, to remove the protection achieved by the illegal copy discriminating means.

In this case, however, even if this protection is removed, since another illegal copy discriminating means discriminates an illegal copy, when the event generating means corresponding thereto generates an event at a predetermined probability, an abnormal operation is generated again by the abnormal operation generating section. Therefore, when a plurality of pairs of the illegal copy discriminating means and the event generating means are provided, even if one protection has been removed, an abnormal operation will be generated at another predetermined probability.

Where single illegal copy discriminating means and single event generating means are provided respectively, the probability at which an abnormal operation is generated in response to illegal copy discrimination is set to a single value. Therefore, if the probability at which the event generating means generates an event is high, the violator can easily discriminate whether software is copied normally or not, so that the copy protection can be easily removed. On the other hand, if the probability at which the event generating means generates an event is low, there exists a problem in that it is possible to practically use copied software illegally.

In the apparatus according to the present invention, however, since a plurality of pairs of illegal copy discriminating means and event generating means are provided one-to-one correspondence to each other, the probability at which all the abnormal operations are generated by all the abnormal operation generating means is a fairly low value which can be obtained by multiplying all the probabilities of all the event generating means.

Therefore, even if an abnormal operation is generated by any of the illegal copy discriminating means and the corresponding event generating means, and therefore the violator notices the presence of copy protection, since the possibility at which all the abnormal operation is generated is fairly low due to the presence of all the illegal copy discriminating means and the corresponding event generating means, it is extremely difficult for the violator to notice the presence of all the copy protections. Therefore, the violator cannot discriminate whether the copy protections are completely removed or not, thus allowing the violator not to use or sell the illegally copied software extensively.

On the other hand, the probability is relatively high that an abnormal operation is generated when at least one illegal copy discriminating means discriminates an illegal copy and further the corresponding event generating means generates an event. This is because this probability can be obtained by subtracting from 1 a value obtained by multiplying all the probabilities at which the events are not generated. As a result, whenever an illegal copy is used, since any one of the abnormal operations is generated, it is practically impossible to use or sale the illegal copy.

Further, when all the probabilities at which every event is generated by every event generating means are determined to be different from each other, it is possible to more effectively prevent illegal copy by combining high and low probabilities at which abnormal operations are generated, respectively.

In addition, when the illegal copy discriminating section corresponding to copy protection is realized on a circuit of a semiconductor integrated circuit device, since the circuit is more difficult to be copied as compared with software, it is more difficult to remove the copy protection. Further, when the event generating section and the abnormal operation generating section are realized on computer software, these sections can be realized more easily, as compared to cases when they are realized on the circuit.

As described above, in the illegal copy prevention apparatus according to the present invention, since a plurality of pairs of illegal copy discriminating means and event generating means are provided one-to-one correspondence to each other, when an object is illegally copied, the probability at which an abnormal operation is generated is relatively high and therefore the illegal copy is not usable. On the other hand, since the probability at which all the abnormal operations are generated is considerably low, the violator cannot notice the presence of all the copy protections implemented by every illegal copy discriminating means, thus preventing the violator from using or selling the illegal copy extensively, or providing an effective illegal copy prevention.

DETAILED DESCRIPTION OF THE PREFERRED EMBODIMENTS

Embodiments of the present invention will be described hereinbelow with reference to the attached drawings.

Figure 1:
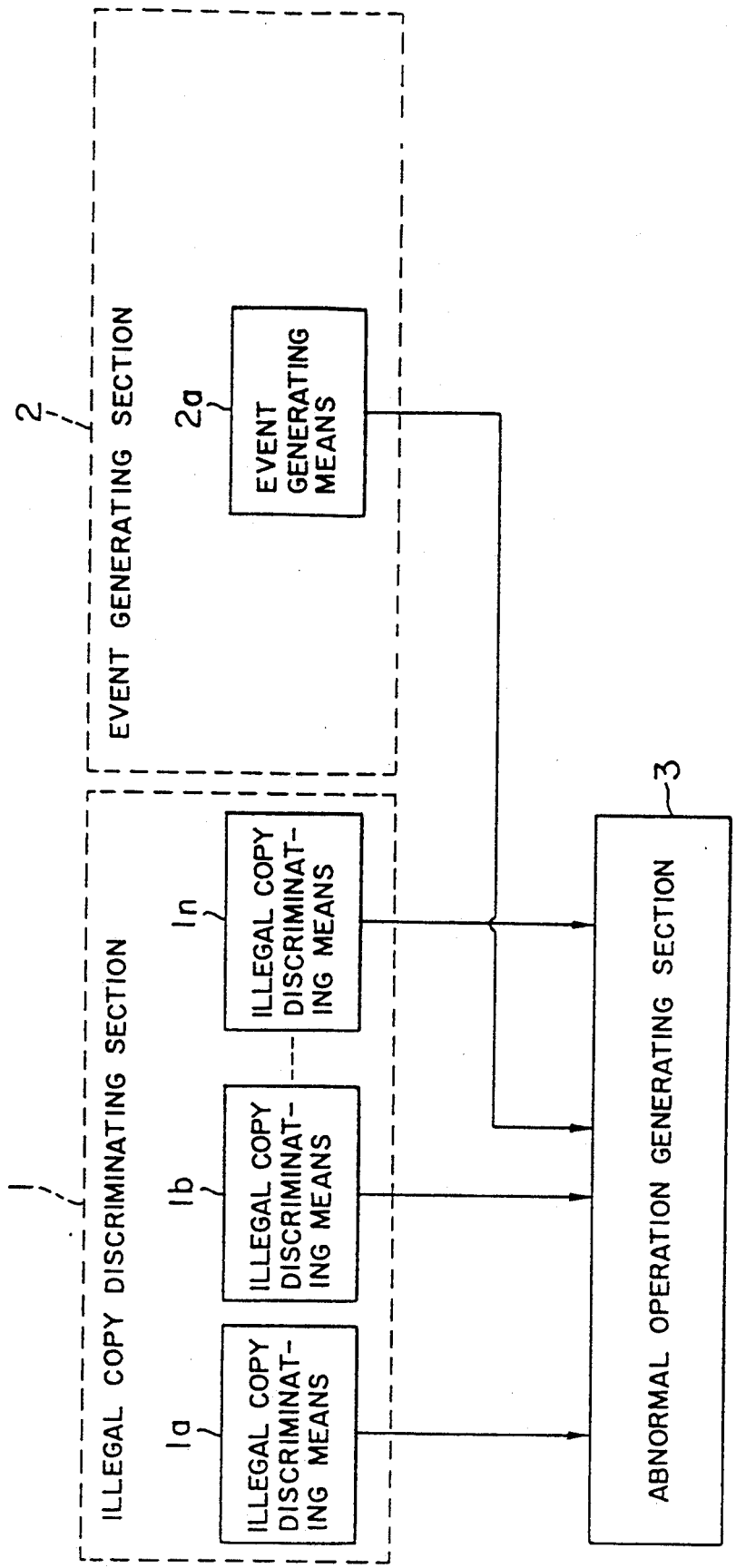
FIGS. 1 to 3 are schematic block diagrams showing embodiments of the illegal copy prevention apparatus according to the present invention.

FIG. 1 is a block diagram showing a configuration of the present invention, in which the apparatus comprises an illegal copy discriminating section 1, an event generating section 2, and an abnormal operation generating section 3. The illegal copy discriminating section 1 is composed of a plurality of illegal copy discriminating means 1a, 1b,..., 1n (n: an interger of 2 or more) for discriminating whether an object is copied illegally. The event generating section 2 is composed of a single event generating means 2a for generating an event at a predetermined probability. The abnormal operation generating section 3 generates an abnormal operation when any one of the illegal copy discriminating means 1a, 1b,..., 1n discriminates an illegal copy and further the event generating section 2 generates an event at a predetermined probability. For instance, when the illegal copy discriminating means 1a discriminates an illegal copy and further the event generating means 2a generates an event, an abnormal operation is generated.

Figure 3:
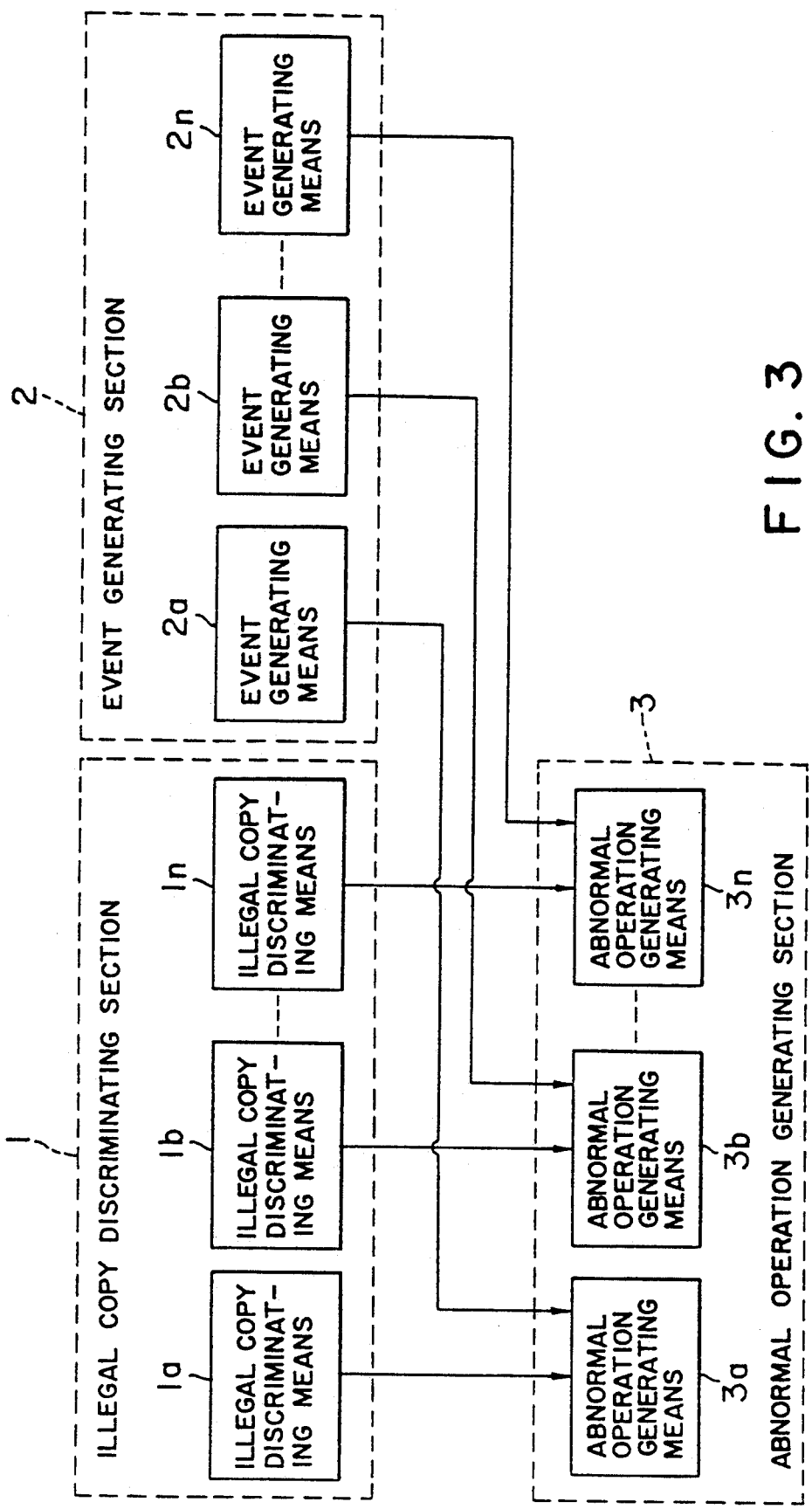

In FIG. 1, a single abnormal operation generating means 3 is provided. Without being limited thereto however, it is also preferable to provide an abnormal operation generating section 3 composed of a plurality of abnormal operation generating means 3a, 3b,..., 3n so as to correspond to the illegal copy discriminating means and the event generating means, respectively, as shown in FIG. 3. In this case, when the illegal copy discriminating means 1a detects an illegal copy and further the event generating means 2a generates an event, the abnormal operation generating means 3a generates an abnormal operation.

Figure 2:
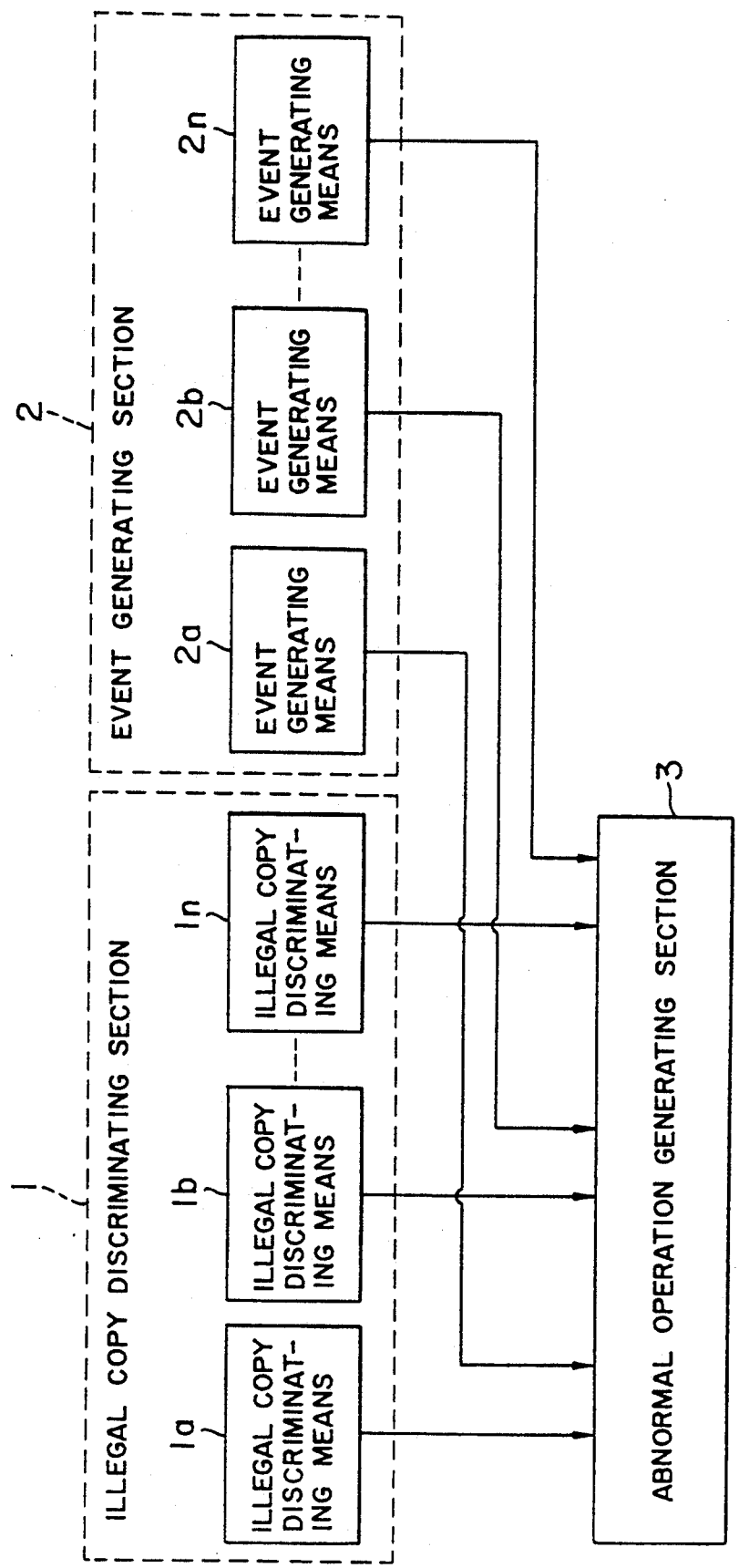

FIG. 2 is a block diagram showing a configuration of the present invention, in which the apparatus comprises an illegal copy discriminating section 1, an event generating section 2, and an abnormal operation generating section 3. The illegal copy discriminating section 1 is composed of a plurality of illegal copy discriminating means 1a, 1b,..., 1n, (n: 2 or more integer) for discriminating whether an object is copied illegally, independently. In the same way, the event generating section 2 is composed of a plurality of event generating means 2a, 2b, ..., 2n for generating an event at a predetermined probability, independently. The abnormal operation generating section 3 generates an abnormal operation when any one of the illegal copy discriminating means 1a, 1b,..., 1n discriminates an illegal copy and further the event generating means corresponding to the illegal copy discriminating means which discriminates an illegal copy generates an event at a predetermined probability. For instance, when the illegal copy discriminating means 1a discriminates an illegal copy and further the corresponding event generating means 2a generates an event, an abnormal operation is generated. Here, the probability at which the event generating means generates an event may be equal to or different from each other in these event generating means.

In FIG. 2, a single abnormal operation generating means 3 is provided. Without being limited thereto however, it is also preferable to provide an abnormal operation generating section 3 composed of a plurality of abnormal operation generating means 3a, 3b, ..., 3n so as to correspond to the illegal copy discriminating means and the event generating means, respectively, as shown in FIG. 3. In this case, when the illegal copy discriminating means 1a detects an illegal copy and further the event generating means 2a generates an event, the abnormal operation generating means 3a generates an abnormal operation.

Figure 5:
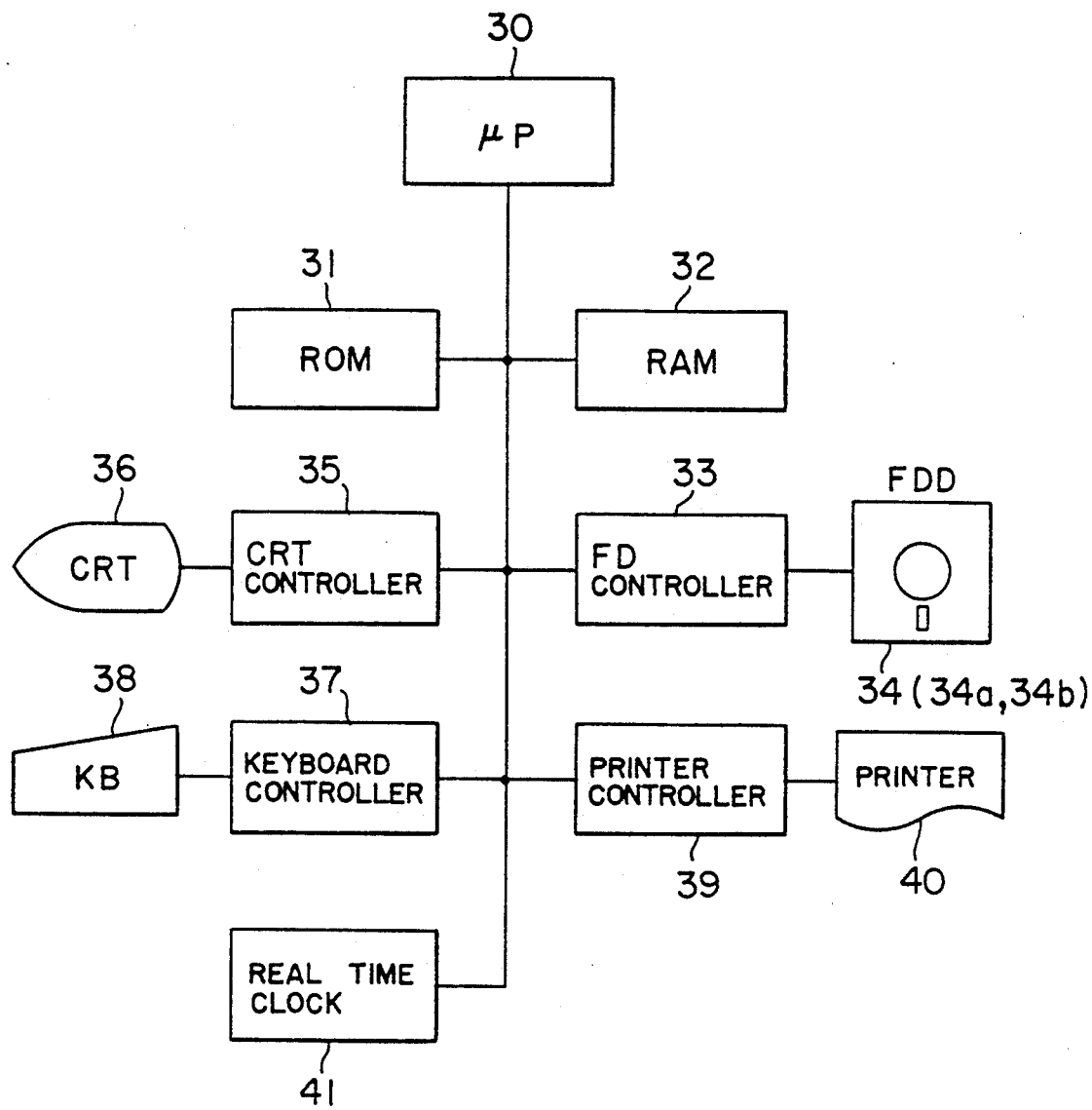
FIG. 5 is a block diagram showing an ordinary computer for protecting software from illegal copying.

The illegal copy prevention apparatus for preventing computer software from illegal copying will be described hereinbelow. FIG. 5 shows an ordinary computer system configuration for executing or copying software. A microprocessor 30 executes various instructions in accordance with programs stored in a ROM 31 or a RAM 32; reads or writes new programs and data to or from a floppy disk (magnetic recording medium) 34 via a floppy disk controller 33; displays messages and data read with a keyboard 38 via a keyboard controller 37 on a CRT unit 36 via a CRT controller 35; and outputs executed results to a printer 40 via a printer controller 39. Further, a real time clock 41 indicates the current time.

Figure 4:
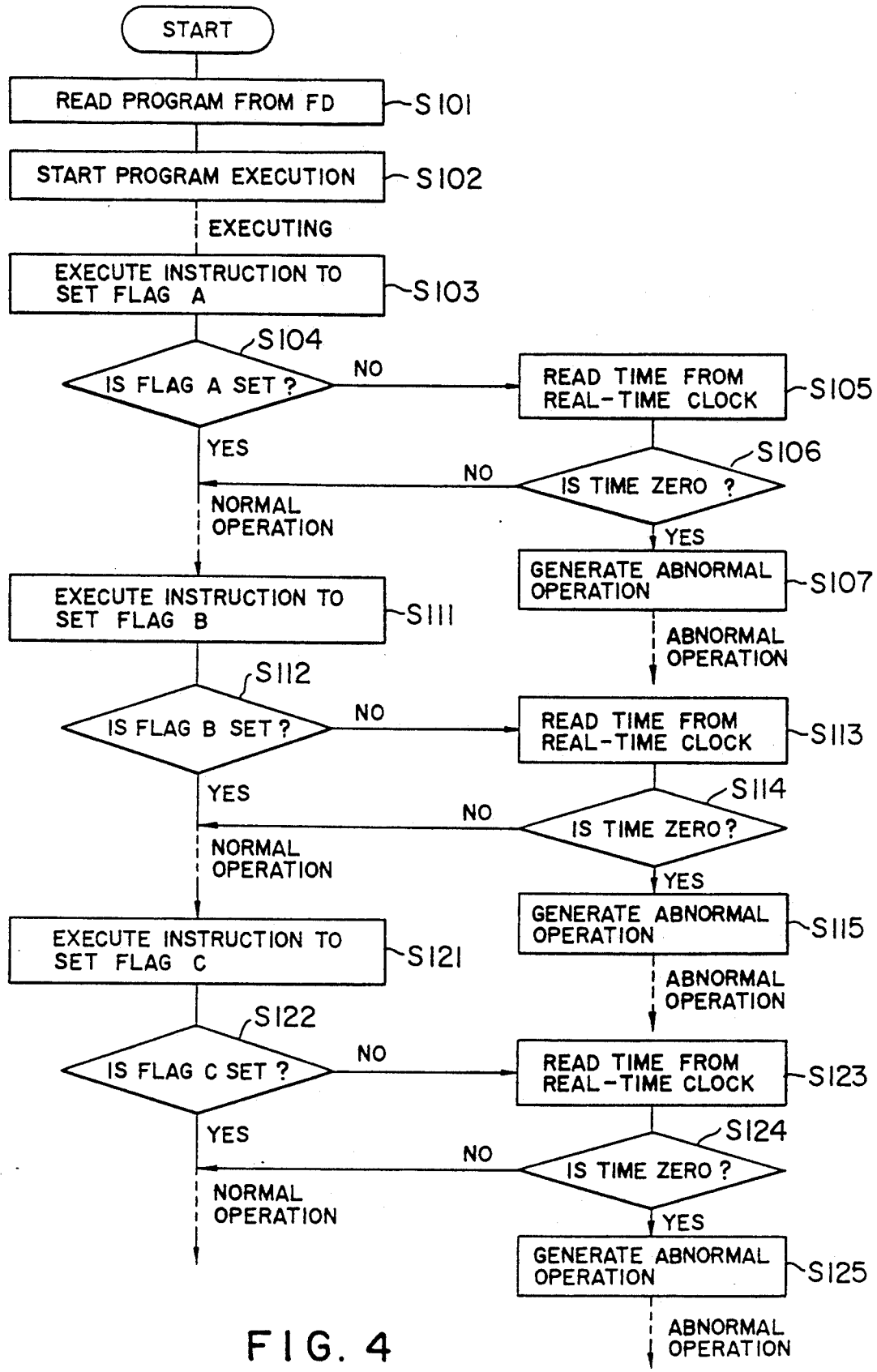
FIG. 4 is a flow chart for explaining the operation procedure of an embodiment of the illegal copy prevention apparatus for protecting software from illegal copying.

FIG. 4 shows a flow chart for assistance in explaining a procedure of preventing programs stored on an original floppy disk (34a) from being illegally copied onto another floppy disk (34b).

The microprocessor (referred to as $\mu P$) 30 reads a program from an original floppy disk 34a (in step S101), and executes the program (in step S102). $\mu P$ 30 executes an instruction to set a flag A (in step S103). This FLAG setting instruction can be executed at any time when the program is being executed. $\mu P$ checks whether the flag A is set or not (in step S104). If set, since this indicates that the floppy disk is determined to be normal and therefore legal, a normal operation is kept executed. If not set, the floppy disk is determined to be abnormal and therefore illegal. The illegal copy discriminating means detects an illegal copy by instructing $\mu P$ to set a flag A and detecting whether the flag A can be set.

The instruction to set flag A will be explained in further detail below: In an original floppy disk 34a, a certain hardware damage is previously formed at blank areas other than that where the program is loaded. Therefore, the format in the blank area is broken, and no data can be read therefrom. The illegal copy discriminating means instruct the $\mu P$ to read data from the broken blank area. Therefore, when the original legal floppy disk 34a is driven to run programs and this instruction is executed, it is impossible to read data from the broken blank area, so that an error is generated. On the other hand, since a violator does not know that there exists specific hardware damage and therefore the blank area format on the illegal floppy disk 34b is not broken, when this illegal floppy disk 34b is driven to run program. Therefore, when the illegal floppy disk is driven to run a program, it is possible to read data from the blank area, so that no error can be produced and displayed. Here, an instruction to read data from the blank area is included in an instruction to set flag A. That is, flag A is set when an error is generated in response to the instruction to read data from the blank area and reset when no error is generated in response thereto. In other words, when a program read from an original floppy disk 34A is executed, an error is generated to set flag A, which indicates a legal floppy disk. In contrast, when a program read from an illegal floppy disk 34b is executed, no error is generated without setting flag A, which indicates an illegal floppy disk.

Further, the event generating means generates an event at a predetermined probability as follows: $\mu P$ 30 reads the current time from the real time clock 41 (in step S105) and checks whether the real-time clock indicates, for example, 0 seconds (indicating the start of a new minute) or not (in step S106). If YES, $\mu P$ determines that an event is generated and if NO, $\mu P$ determines that an event is not generated. That is, if the current time is 0 (an event occurs) (in step S106), an abnormal operation is generated by the abnormal operation generating means (in step S107). If the current time is not 0 (an event does not occur) (in step S106), a normal operation is kept generated.

In the above-mentioned operation procedure, when the illegal copy discriminating means discriminates an illegal copy, an event is generated by the event generating means. Without being limited thereto, it is possible to reverse the above operation procedure. That is, after the event generating means has generated an event, the illegal copy discriminating means discriminates whether an illegal copy is used. If an illegal copy is discriminated, an abnormal operation is generated. Instead, it is also possible to operate both functions simultaneously.

Once an illegal copy has been discriminated and an abnormal operation is generated at a predetermined probability, the violator notices the presence of copy protection and tries to remove this copy protection by repeatedly comparing the illegal copy with the original copy for analyzation of copy protection.

In the system according to the present invention, the similar protection operation from steps S103 to S107 is repeated. In other words, other protections different from the first protection (if removed) are provided by the remaining illegal copy discriminating means. In practice, the $\mu P$ 30 executes an instruction to set flag B (in step S111). This flag B setting instruction is similar to that to set flag A. The $\mu P$ 30 checks whether flag B is set (in step S112). If set, $\mu P$ discriminates that the floppy disk is legal to maintain a normal operation. If not set, $\mu P$ discriminates that the floppy disk is illegal. The event generating means corresponding to this illegal copy discriminating means reads the current time (in step S113). The $\mu P$ checks whether the current time is zero (an event occurs) (in step S114). If NO (an event does not occur), a normal operation is kept executed. If YES (an event occurs), an abnormal operation is generated (in step S115). In this case, it is possible to change the probability (at which an abnormal operation is generated) of the event generating means, respectively by providing other clocks different from the real-time clock 41.

As described above, even if a first copy protection is removed by the violator, since there exist other copy protections achieved by other illegal copy discriminating means, it is possible to generate an abnormal operation at a predetermined probability. Therefore, it is extremely difficult for the violator to check whether all the copy protections can be removed, thus prohibiting illegally copied floppy disk from being used or sold.

For example, even if two abnormal operations are generated in sequence from steps S107 to S115 and the violator removes both the copy protections, since another illegal copy discriminating means protects the original floppy disk from being copied in accordance with the control steps from S121 to S125 in the same way as in steps from S103 to S107 or from S111 to S115. That is, flag C is set (in step S121); if set, a normal operation is maintained (in step S122); if not set, a time is read p 15 from a clock (in step S123); if the time is not 0, a normal operation is maintained (in step S124); if the time is 0, an abnormal operation is generated (in step S125).

As described above, where there exist a plurality of copy protections, it becomes extremely difficult for the violator to notice the presence of all the protections and further remove all the protections completely, so that it is possible to effectively prevent illegal floppy disk copying.

Here, since the value obtained by multiplying all of the probabilities of all of the event generating means is very small, it is seldom that all of the abnormal operations are generated. Therefore, it is extremely difficult for the violator to notice the presence of all of the copy protections and further remove all of them. The above-mentioned feature can be attained by setting a relatively small probability value to any one or all of the event generating means.

Further, since a value obtained by subtracting from 1 a value obtained by a multiplication of all the probabilities at which the events are not generated is relatively high, the probability at which at least one abnormal operation is generated becomes high, so that it is extremely difficult to use an illegal floppy disk 34b, thus effectively preventing an original floppy disk from being copied illegally.

Figure 6:
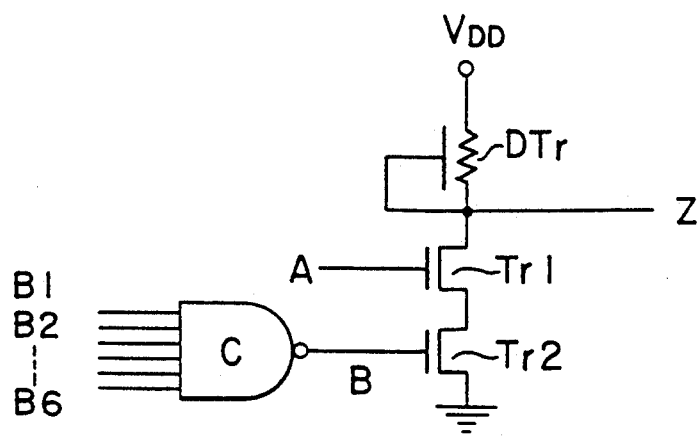
FIG. 6 is a circuit diagram showing an embodiment of the illegal copy prevention apparatus for protecting a circuit configuration of a semiconductor IC device from illegal copying.
Figure 7:
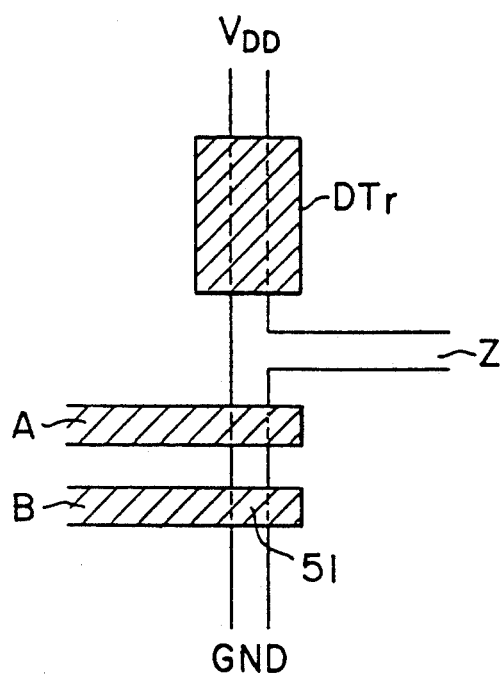
FIG. 7 is a prior-art circuit pattern diagram for realizing a part of the same circuit shown in FIG. 5 on a semiconductor IC device.

The illegal copy prevention apparatus has been explained by taking the case where applied to software copy protections. The apparatus for protecting the circuit configuration a semiconductor IC device from illegal copying will be described hereinbelow. FIG. 6 shows a NAND gate by which the illegal copy discriminating means are realized.

In FIG. 6, a depletion transistor DTr is connected between a supply voltage $V_{DD}$ and ground GND in such a way that potential at a signal line Z is pulled up when two transistors Tr1 and Tr2 are both kept turned off. However, when a signal line A connected to a gate electrode of the transistor Tr1 and a signal line B connected to a gate electrode of the transistor Tr2 are both at "1" in voltage level, since the two transistors Tr1 and Tr2 are both turned on, a signal line Z drops to "0" in voltage level. A NAND gate C having six input terminals B1 to B6 is connected to the signal line B. Therefore, the signal line Z changes to "0" only when the signal line A is at "1" and further except when a "1" level signal is applied to all the input terminals B1 to B6 of the NAND gate C (i.e. when the signal line B is at "1").

FIG. 6 shows a layout pattern on which the circuit shown in FIG. 5 is realized by an N-MOS semiconductor device. Here, the signal lines A and B are formed of polysilicon, and a region near a point of intersection between the signal lines B and Z is formed into a conductive state by ion implantation, in order to disable the transistor Tr2. Therefore, the potential of the signal line Z is subjected to the influence of the signal line A, irrespective of the potential of the signal line B or those of signals inputted to the input terminals B1 to B6 of the NAND gate C. In general, since the circuit configuration of the semiconductor IC device is illegally copied by visual inspection with a microscope, it is impossible to recognize the ion implantation by visual check Therefore, the copied circuit functions as $Z = \overline{A \cdot B}$ because of the fact that there exists no ion implantation.

In other words, when at least one of the input signals applied to the input terminals B1 to B6 is at "0", since the copied circuit operates normally in the same function as that of the original circuit, the violator cannot notice the presence of circuit protection. However, only when all the signals applied to the input terminals B1 to B6 are at "1", an abnormal operation occurs being different from the original circuit. As described above, it is possible to generate an abnormal operation at a predetermined probability whenever the circuit is illegally copied. Here, if an assumption is made that the probability at which each signal is at "1" is equal to that at which each input signal is at "0", the probability at which an abnormal operation occurs is as small as $1/2^6$. However, it is of course possible to easily adjust the probability of abnormal operation generation by changing the number of input signals applied to the NAND gate C or changing the probability at which the input signal changes to "1" or "0". When a plurality of NAND circuits as described above are formed in an IC device, it is possible to protect the circuit configuration from illegal copy in the same way as when software can be protected.

The above two embodiments have been explained by way of example, and therefore the present invention is not limited thereto. For instance, in the case of the software protection apparatus, it is possible to discriminate an illegal copy in other procedure different from that shown in FIG. 3. Further the probability at which an event is generated can be determined by counting the number of specific software routines which have been executed, without use of a hardware timer. In this case, a value is incremented whenever a specific routine has been executed and cleared when the incremented value reaches a predetermined value.

What is claimed is:
1. An illegal copy prevention apparatus, comprising:
    (a) an illegal copy discriminating section including a plurality of illegal copy discriminating means for separately discriminating whether an object has been illegally copied,
    (b) an event generating section for generating an event which occurs according to a predetermined occurrence probability;
    (c) an abnormal operation generating section for generating an abnormal operation to halt illegal copying in response to the event generated by said generating section when any one of said illegal copy discriminating means discriminates an illegal copy;
    (d) thereby preventing an illegal copier from predicting the generation of an abnormal operation.
2. The illegal copy prevention apparatus of claim 1, wherein said event generating section comprises two or more event generating means each having a one-to-one correspondence to said illegal copy discriminating means and having its own predetermined probability, an overall occurrence probability being a sum of predetermined occurrence probabilities of said two or more event generating means.

3. The illegal copy prevention apparatus of claim 2, wherein said event generating means generates events at a predetermined time signal.

4. The illegal copy prevention apparatus of claim 1, wherein each of said two or more event generating means generates an event at each different occurrence probability.

5. The illegal copy prevention apparatus of claim 2, wherein said abnormal operation generating section comprises two or more abnormal operation generating means having one-to-one correspondence to said illegal copy discriminating means and to said event generating means, for generating abnormal operations.

6. The illegal copy prevention apparatus of claim 1, wherein said illegal copy discriminating means is a circuit configuration of a semiconductor integrated circuit device, and said event generating means and said abnormal operation generating means are realized by computer software.

* * * * *